(12) United States Patent
Queen

(10) Patent No.: US 8,220,823 B2
(45) Date of Patent: Jul. 17, 2012

(54) PEDIATRIC TRANSPORTER AND ASSOCIATED METHODS

(76) Inventor: Dina Queen, Huntington, WV (US)

( * ) Notice: Subject to any disclaimer, the term of this patent is extended or adjusted under 35 U.S.C. 154(b) by 368 days.

(21) Appl. No.: 12/405,320

(22) Filed: Mar. 17, 2009

(65) Prior Publication Data

US 2009/0236826 A1    Sep. 24, 2009

Related U.S. Application Data

(60) Provisional application No. 61/037,533, filed on Mar. 18, 2008.

(51) Int. Cl.
*B62B 7/12* (2006.01)

(52) U.S. Cl. ............. 280/650; 280/658; 280/47.38; 280/47.41

(58) Field of Classification Search .............. 280/642, 280/643, 647, 648, 650, 657, 658, 47.34, 280/47.35, 47.36, 47.371, 47.38, 47.39, 47.41
See application file for complete search history.

(56) References Cited

U.S. PATENT DOCUMENTS

| | | | | |
|---|---|---|---|---|
| 1,793,848 | A * | 2/1931 | Gill et al. | 280/7.1 |
| 1,981,285 | A * | 11/1934 | Rechlicz | 248/421 |
| 2,276,792 | A * | 3/1942 | Peltier | 280/7.1 |
| 2,606,593 | A | 8/1952 | Beurskens | |
| 2,993,702 | A * | 7/1961 | Gill | 280/643 |
| 3,079,162 | A * | 2/1963 | Michels, Jr. | 280/7.1 |
| 3,248,125 | A * | 4/1966 | Gill | 280/47.4 |
| 4,586,721 | A * | 5/1986 | Harada et al. | 280/30 |
| 5,090,724 | A | 2/1992 | Fiore | |
| 5,172,715 | A * | 12/1992 | Webb | 135/67 |
| 5,230,523 | A * | 7/1993 | Wilhelm | 280/30 |
| 5,380,023 | A | 1/1995 | McBee | |
| 5,441,289 | A * | 8/1995 | Spielberger | 280/87.051 |
| 5,478,096 | A * | 12/1995 | Ting | 280/30 |
| 5,618,055 | A | 4/1997 | Mulholland | |
| 5,701,968 | A | 12/1997 | Wright-Ott et al. | |
| 5,816,593 | A | 10/1998 | Che | |
| 5,839,748 | A | 11/1998 | Cohen | |
| 5,882,022 | A | 3/1999 | Convertini et al. | |
| 5,899,467 | A * | 5/1999 | Henkel | 280/47.25 |
| 6,311,708 | B1 * | 11/2001 | Howle | 135/67 |
| 6,338,493 | B1 * | 1/2002 | Wohlgemuth et al. | 280/30 |
| 6,422,634 | B2 | 7/2002 | Lundh | |
| 6,698,772 | B1 | 3/2004 | Cervantes | |
| 6,832,770 | B1 | 12/2004 | Wright-Ott et al. | |
| 6,921,101 | B1 * | 7/2005 | Lauren et al. | 280/642 |
| 7,234,722 | B1 | 6/2007 | Madigan et al. | |

(Continued)

*Primary Examiner* — Hau Phan
*Assistant Examiner* — Bryan Evans
(74) *Attorney, Agent, or Firm* — Crose Law LLC; Bradley D. Crose

(57) ABSTRACT

The technology described herein provides a portable, collapsible, and multifunctional pediatric transporter. The pediatric transporter provides walker, stander, sitting chair, stroller, and wheelchair functionality. The pediatric transporter includes frame members joined each to the other forming a frame, non-swiveled, and swiveled wheels, handlebars disposed upon the frame, a handgrip disposed upon each handlebar, a removable, storable seat, a support bar configured to support the seat when the seat is in use and being a handle bar for a standing child when the seat is not is use, a removable, storable standing platform, hinges disposed upon the frame to provide foldability, collapsibility, and portability of the pediatric transporter, and a lever configured to be depressed single-handedly to collapse the pediatric transporter. The pediatric transporter is reconfigurable interchangeably as a walker (ride-upon within the standing platform, walking with without the standing platform, and walking behind), stander, sitting chair, stroller, and wheelchair.

17 Claims, 7 Drawing Sheets

U.S. PATENT DOCUMENTS

| | | | |
|---|---|---|---|
| 7,497,461 B2 * | 3/2009 | Emerson | 280/642 |
| 2002/0038942 A1 | 4/2002 | Gilles et al. | |
| 2003/0222421 A1 * | 12/2003 | Myers et al. | 280/87.051 |
| 2008/0129001 A1 * | 6/2008 | Emerson | 280/30 |
| 2009/0315300 A1 * | 12/2009 | Stiba | 280/648 |
| 2011/0095510 A1 * | 4/2011 | Troup et al. | 280/647 |

* cited by examiner

PEDIATRIC TRANSPORTER AND ASSOCIATED METHODS

CROSS-REFERENCE TO RELATED APPLICATION(S)

The present non-provisional patent application claims the benefit of priority of U.S. Provisional Patent Application No. 61/037,533, which is entitled "PEDIATRIC TRANSPORTER AND ASSOCIATED METHODS", which was filed on Mar. 18, 2008, and which is incorporated in full by reference herein.

FIELD OF THE INVENTION

The technology described herein relates generally to ambulatory, mobility and medical devices. More specifically, the technology described herein relates to a portable, collapsible, and multifunctional pediatric transporter and associated methods. Furthermore, this technology relates to systems and methods for a compact, collapsible pediatric transporter that provides walker, stander, sitting chair, stroller, wheelchair, and the like, functionality.

BACKGROUND OF THE INVENTION

Ambulatory, mobility, and related medical devices are utilized to assist both children and adults with movement and mobility. Known mobility devices include wheelchairs, standers, walkers, and strollers. More complex mobility devices are utilized for the accommodating children and adults with special physical needs.

The following patents and published patent applications are known in the art.

U.S. Published Patent Application No. 2002/0038942, filed by Gilles et al. and published on Apr. 4, 2002, discloses an expandable pediatric walker.

U.S. Pat. No. 6,311,708, issued to Howle on Nov. 6, 2001, discloses a foldable walker.

U.S. Pat. No. 5,816,593, issued to Che on Oct. 6, 1998, discloses a walking frame for disabled persons.

U.S. Pat. No. 6,921,101, issued to Lauren et al. on Jul. 26, 2005, discloses a combined wheelchair, walker, and sitting chair.

U.S. Pat. No. 5,618,055, issued to Mulholland on Apr. 8, 1997, discloses a stander.

U.S. Pat. No. 5,701,968, issued to Wright-Ott et al. on Dec. 30, 1997, discloses a transitional power mobility aid for physically challenged children.

U.S. Pat. No. 6,832,770, issued to Wright-Ott on Dec. 21, 2004, discloses a child ambulation aid with enhanced maneuverability.

U.S. Pat. No. 7,234,722, issued to Madigan et al. on Jun. 26, 2007, discloses a standing baby stroller.

U.S. Pat. No. 5,839,748, issued to Cohen on Nov. 24, 1998, discloses a convertible stroller.

U.S. Pat. No. 5,380,023, issued to McBee on Jan. 10, 1995, discloses a child's vehicle for increased visual interaction.

U.S. Pat. No. 5,090,724, issued to Fiore on Feb. 25, 1992, discloses a stand-up stroller.

U.S. Pat. No. 2,606,593, issued to Beurskens on Aug. 12, 1952, discloses a combination baby walker and stroller.

U.S. Pat. No. 5,882,022, issued to Convertini et al. on Mar. 16, 1999, discloses a stroller standing platform.

U.S. Pat. No. 6,698,772, issued to Cervantes on Mar. 2, 2004, discloses a stroller stand.

U.S. Pat. No. 6,422,634, issued to Lundh on Jul. 23, 2002, discloses a standing board for buggies, push-chairs, and prams.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a portable, collapsible, and multifunctional pediatric transporter and associated methods. Furthermore, this technology provides systems and methods for a compact, collapsible pediatric transporter that provides walker, stander, sitting chair, stroller, wheelchair, and the like, functionality.

In one exemplary embodiment, this technology provides a pediatric transporter. The pediatric transporter includes a removable, storable seat and a removable, storable standing platform. As such, the pediatric transporter is reconfigurable interchangeably as a stand-behind walker, stand-within walker, stander, sitting chair, stroller, and wheelchair. The pediatric transporter can also include a support bar configured to support the seat when the seat is in use and being a handle bar for a standing child when the seat is not is use. The pediatric transporter can further include hinges on the frame to provide foldability, collapsibility, and portability of the pediatric transporter. The pediatric transporter can also include a lever configured to be depressed single-handedly to collapse the pediatric transporter. The pediatric transporter can further include a plurality of frame members joined each to the other forming a frame and a plurality of wheels disposed upon the frame. The pediatric transporter can also include a plurality of handlebars disposed upon the frame a handgrip disposed upon each of the plurality of handlebars.

In another exemplary embodiment, this technology provides a portable, collapsible, and multifunctional pediatric transporter for transporting a child with combined and interchangeable walker, stander, sitting chair, stroller, and wheelchair services. The pediatric transporter includes a plurality of frame members joined each to the other forming a frame, a plurality of wheels disposed upon the frame, a plurality of handlebars disposed upon the frame, a handgrip disposed upon each of the plurality of handlebars, a removable, storable seat, a support bar configured to support the seat when the seat is in use and being a handle bar for a standing child when the seat is not is use, a removable, storable standing platform, a plurality of hinges disposed upon the frame to provide foldability, collapsibility, and portability of the pediatric transporter, and a lever configured to be depressed single-handedly to collapse the pediatric transporter. The pediatric transporter is reconfigurable interchangeably as a walker, stander, sitting chair, stroller, and wheelchair.

In yet another exemplary embodiment, this technology provides a method for pediatric transportation with interchangeable walker, stander, sitting chair, stroller, and wheelchair services. The method includes utilizing a pediatric transporter comprising a plurality of frame members joined each to the other forming a frame, a plurality of wheels disposed upon the frame, a plurality of handlebars disposed upon the frame, a handgrip disposed upon each of the plurality of handlebars, a removable, storable seat, a support bar configured to support the seat when the seat is in use and being a handle bar for a standing child when the seat is not is use, a removable, storable standing platform, a plurality of hinges disposed upon the frame to provide foldability, collapsibility, and portability of the pediatric transporter, and a lever configured to be depressed single-handedly to collapse the pediatric transporter.

The method additionally includes operatively reconfiguring the pediatric transporter as a stand-behind walker with the removable, storable standing platform stored upon a back of the frame, operatively reconfiguring the pediatric transporter as a ride-upon walker with the removable, storable standing platform placed within the frame, operatively reconfiguring the pediatric transporter as a stander with the removable, storable standing platform placed within the frame, operatively reconfiguring the pediatric transporter as a sitting chair with the removable, storable seat, operatively reconfiguring the pediatric transporter as a stroller, and operatively reconfiguring the pediatric transporter as a wheelchair.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a portable, collapsible, and multifunctional pediatric transporter and associated methods. Furthermore, this technology provides systems and methods for a compact, collapsible pediatric transporter that provides walker, stander, sitting chair, stroller, wheelchair, and the like, functionality.

Figure 1:
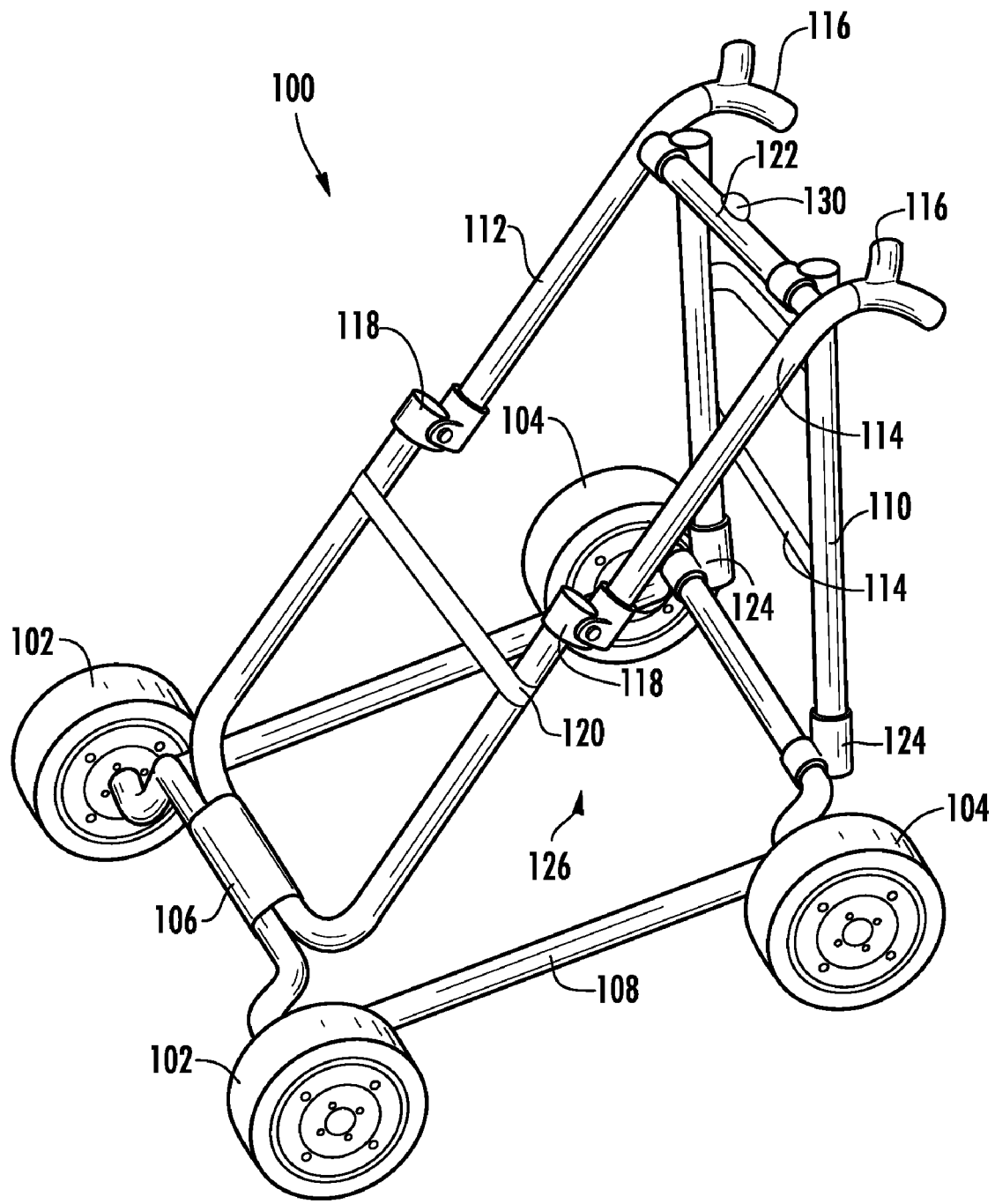
FIG. 1 is a front perspective view of a pediatric transporter, according to an embodiment of the invention.

Referring now to FIG. 1, a pediatric transporter 100 is disclosed. The pediatric transporter 100 is reconfigurable interchangeably as a stand-behind walker, stand-within walker, stander, sitting chair, stroller, and wheelchair. Dependent upon the physical needs, or other variable factors, of a child, the pediatric transporter 100 is utilized in one of the many available functions. The multifunctional pediatric transporter 100 allows the caregiver of a child to utilize one device to accommodate a multiplicity of transportation concepts. The pediatric transporter 100 is easily collapsible and foldable, and thus very portable, providing for easy transport in an automobile, or the like. The pediatric transporter 100 likewise is configured for easy and quick set up.

The pediatric transporter 100 includes a plurality of frame members 108, 110, 112 joined each to the other forming a pediatric transporter frame. Frame member 108 is a generally square base frame member located nearest the ground. Frame member 110 is a generally square back frame member located nearest a person pushing the pediatric transporter 100 or the child utilizing the pediatric transporter 100 as a walk-behind walker. Frame member 112 is a generally square front frame member connecting frame members from the top of the back frame member 110 to the front of the base frame member 108. The various frame members 108, 110, 112 can be manufactured of aluminum or other lightweight metal, durable plastic components, or the like.

Base frame member 108 includes a plurality of wheels. By way of example, the base frame member 108 includes two non-swivel (non-turning) wheels 104 and two swivel wheels 102. Alternatively, the swivel wheels 102 can be located in the back while the non-swivel wheels 104 are in front. Alternatively, the pediatric transporter 100 can utilize non-swivel wheels 104 or swivel wheels 102 for all of the wheels.

Base frame member 108 provides area 126 for placement of a standing platform when the pediatric transporter 100 is utilized as a stander or a ride-upon walker. By way of example, the base frame member 108 can be located three and a half to four inches above the ground. Base frame member 108 is, for example, approximately 18 inches in width in the front and approximately 20 inches in width in the back. A narrower front provides stability to the pediatric transporter 100 and lessens the likelihood of a tip-over. The length can be 24 to 36 inches. Dimensions can be varied.

Base frame member 108 is hingedly connected to back frame member 110 with hinges 124 and front frame member 112 with hinges 124. Thus, once the pediatric transporter 100 is collapsed and folded the various frame members 108, 110, 112 fold in relation to one another. Specifically on front frame member 112 two hinges 118 provide for the front frame member 112 to essentially fold inwardly in half, thus allowing the back frame member 110 to fold forward from a position perpendicular to the base frame member 108 to a position that is parallel, and just above, the base frame member 108. Alternatively, the frame members 108, 110, 112 can be collapsed and folded by means other than hinges 106, 118, 124, so long as the pediatric transporter 100 is easily foldable into a compact transportable unit.

Front frame member 112 includes a pair of handles 116 by which to grip the pediatric transporter 100. Each handle 116 can be configured with a handgrip to provide comfort and a better grip. The pair of handles 116 is telescoping to accommodate persons of varying degrees of height. Additionally, an adult can extend the telescoping handles 116 to provide a suitable height for gripping, while a child or shorter person can leave the telescoping handles 116 in an unextended or partially extended position. Handle configurations can vary. By way of example, a single handle bar can be utilized rather than two handles.

The front frame member 112 includes a support bar 120. The support bar 120 provides structural support to the front frame member 112 and pediatric transporter 100. Additionally, the support bar 120 provides support for a seat when it is utilized in the pediatric transporter 100. Furthermore, the support bar 120 provides a handlebar to a standing child when the seat is not is use and the child is standing within the pediatric transporter.

The back frame member 110 includes a pair of support bars 114. The support bars 114 provide structural support to the back frame member 112 and pediatric transporter 100. Additionally, the support bars 114 provide a means by which a seat and a standing platform can be stored upon the pediatric transporter 100 when not in use. The back frame member 110 can be, for example, 36 inches in height from the ground. Dimensions can vary.

The front frame member 112 includes a lever 122 configured to be depressed single-handedly to collapse the pediatric transporter 100. The lever 122 is centrally located on horizontal bar 130 between the telescoping handles 116 for convenience. Depression of the lever 122 disengages the locks (not shown) supporting hinges 118 and allows for the front frame member 112 to fold inwardly and for the back frame member 110 to fold forward toward the base frame member 108. Once collapsed and folded, the pediatric transporter 100 is suitable for transportation or storage. The pediatric transporter 100 can be collapsed and folded with one hand.

Figure 2:
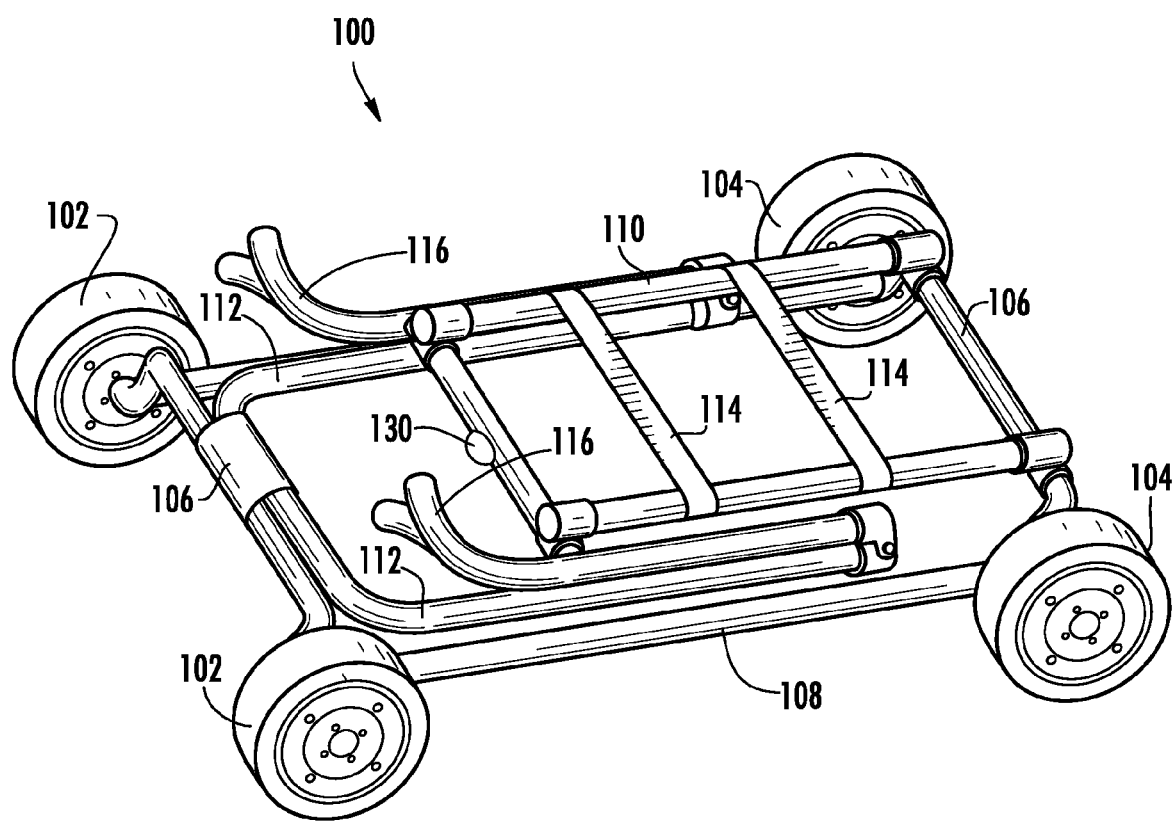
FIG. 2 is a front perspective view of a pediatric transporter, according to an embodiment of the invention, illustrating, in particular, the collapsibility and foldability of the pediatric transporter.

Referring now to FIG. 2, the pediatric transporter 100 is shown in a collapsed and folded position. The overall height of the pediatric transporter 100 is greatly reduced when collapsed and folded. By way of example, the pediatric transporter 100 is approximately eight inches in height when collapsed and folded. The ease in transporting the pediatric transporter 100, combined with its functionality as a walker, stander, sitting chair, stroller, and wheelchair, make it a suitable choice for portability and all-in-one use.

Figure 3:
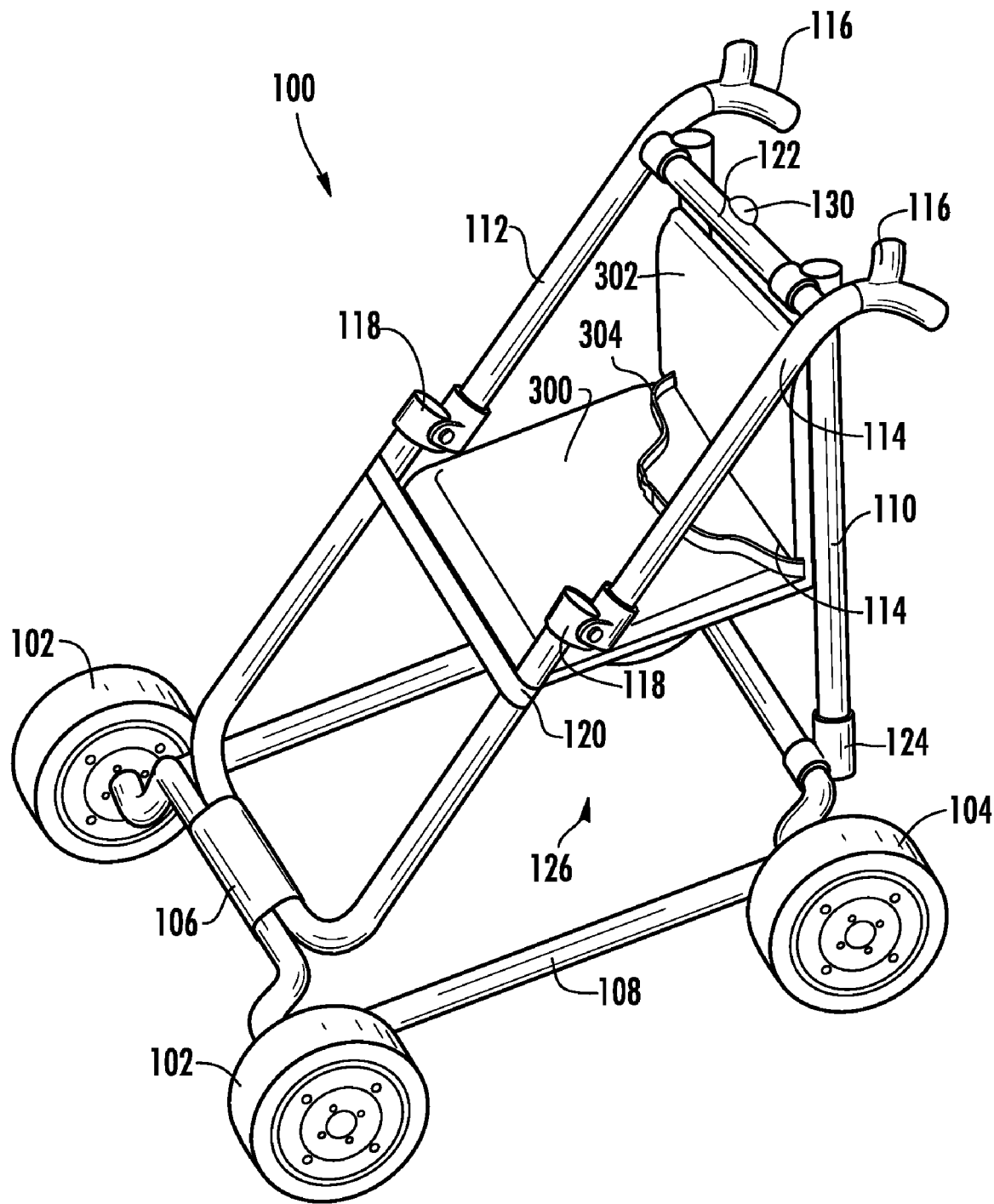
FIG. 3 is a front perspective view of a pediatric transporter, according to an embodiment of the invention, illustrating, in particular, the seat portion of the pediatric transporter.

Referring now to FIG. 3, a pediatric transporter 100 is shown in a configuration suitable as a stroller, wheelchair, or sitting chair. The pediatric transporter 100 also includes a removable, storable seat 300. The seat 300 can be manufactured from a lightweight, durable plastic, vinyl, cushion, or the like, such that it strong enough to support the weight of a child. The seat 300 includes snaps, or the like, to secure the seat 300 to the pediatric transporter 100. When not in use, the removable, storable seat 300 can be placed upon hooks (not shown), or the like, on the back frame member 110 and its support bars 114. Such placement provides that the seat 300 is always with the pediatric transporter 100 even when not in use. Seat 300 can include a seat back 302 to provide back support. The seat 300 and seat back 300 are foldable, such that the seat 300 can fold back into the back frame member 110 against the seat back 302. The seat 300 can be held in a stored position by a clasp to keep the seat 300 in a folded back position. Additionally, seat 300 can include a seat belt 304 and buckle to provide a restraint to a seated child when necessary.

Figure 4:
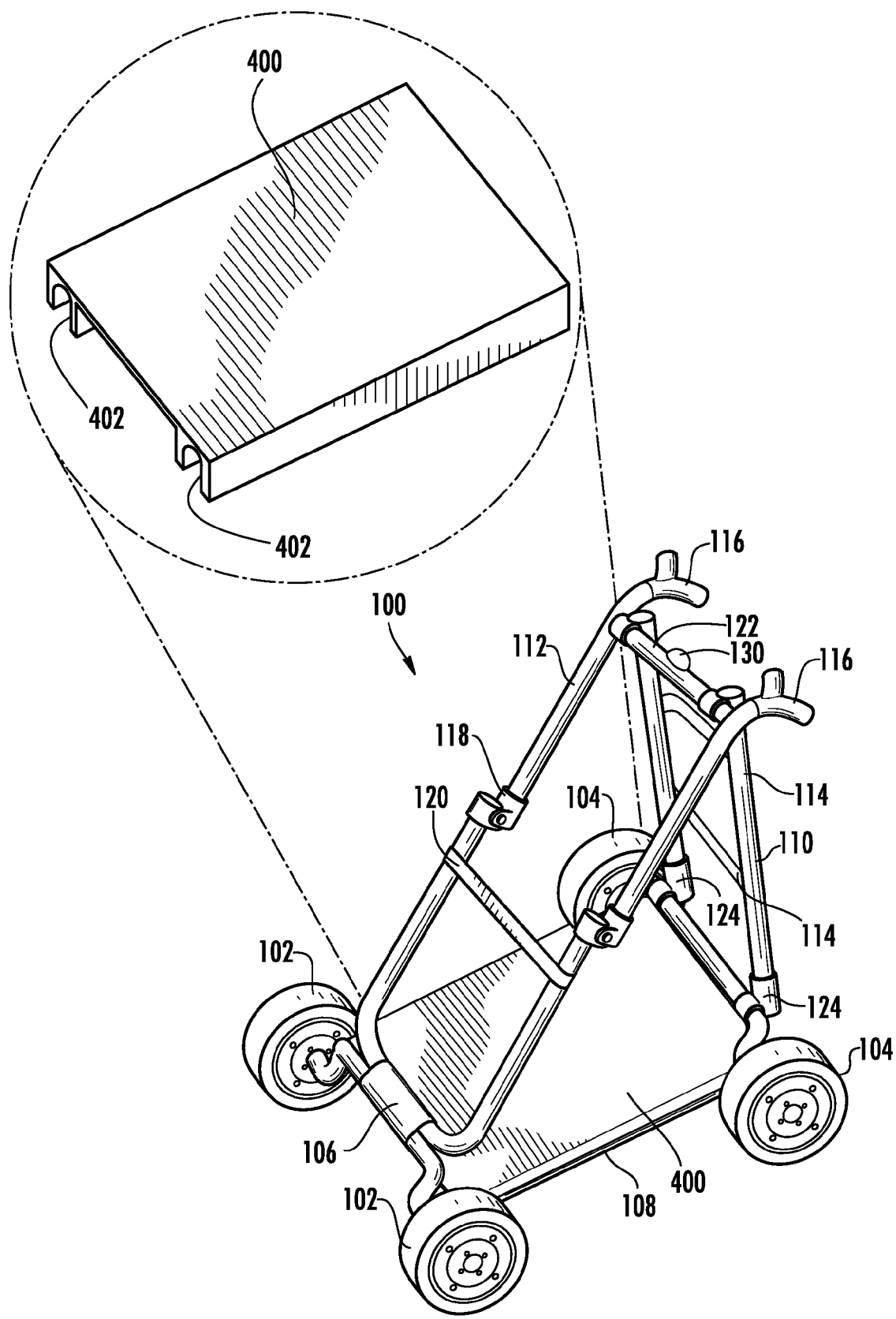
FIG. 4 is a front perspective view of a pediatric transporter, according to an embodiment of the invention, illustrating, in particular, the floor platform portion of the pediatric transporter.

Referring now to FIG. 4, a pediatric transporter 100 is shown in a configuration suitable as a stander or ride-upon walker. The pediatric transporter 100 also includes a removable, storable standing platform 400. The standing platform 400 can be manufactured from a lightweight, durable plastic material, or the like, such that it strong enough to support the weight of a child. The standing platform 400 includes snaps, or the like, to secure the standing platform 400 to the pediatric transporter 100. By way of example, grooves 402 can snap over the base frame member 108 to hold the standing platform 400 securely in place. When not in use, the removable, storable standing platform 400 can be placed upon hooks, or the like, on the back frame member 110 and its support bars 114. Such placement provides that the standing platform 400 is always with the pediatric transporter 100 even when not in use for standing upon.

Figure 5:
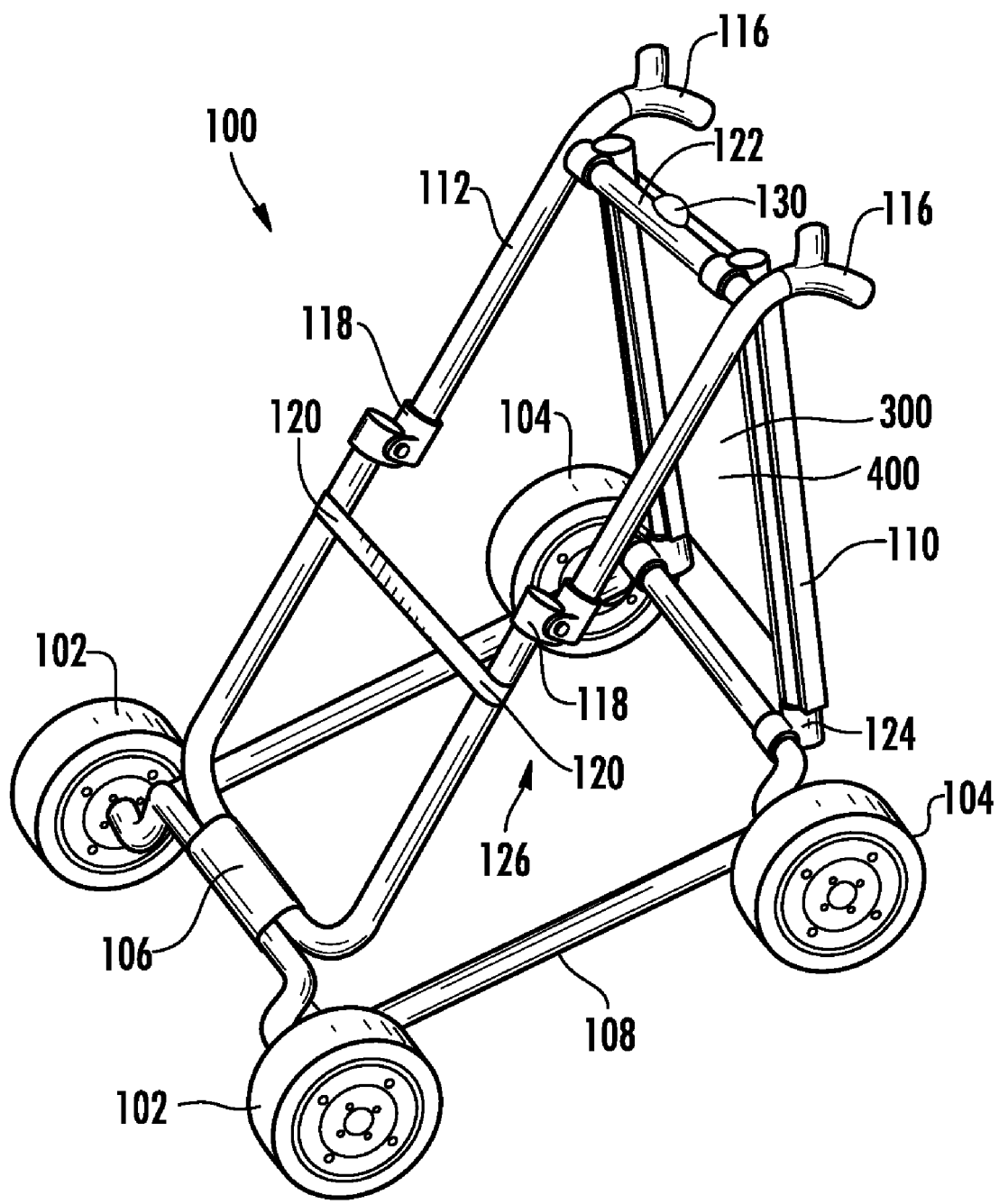
FIG. 5 is a front perspective view of a pediatric transporter, according to an embodiment of the invention, illustrating, in particular, the seat portion and the floor platform portion utilized in a stored position on the back of the pediatric transporter.

Referring now to FIG. 5, a pediatric transporter 100 is shown with the removable, storable seat 300 and the removable, storable standing platform 400 utilized in a stored position. When not in use, the removable, storable seat 300 can be placed upon hooks, or the like, on the back frame member 110 and its support bars 114. When not in use, the removable, storable standing platform 400 can be placed upon hooks, or the like, on the back frame member 110 and its support bars 114.

Figure 6:
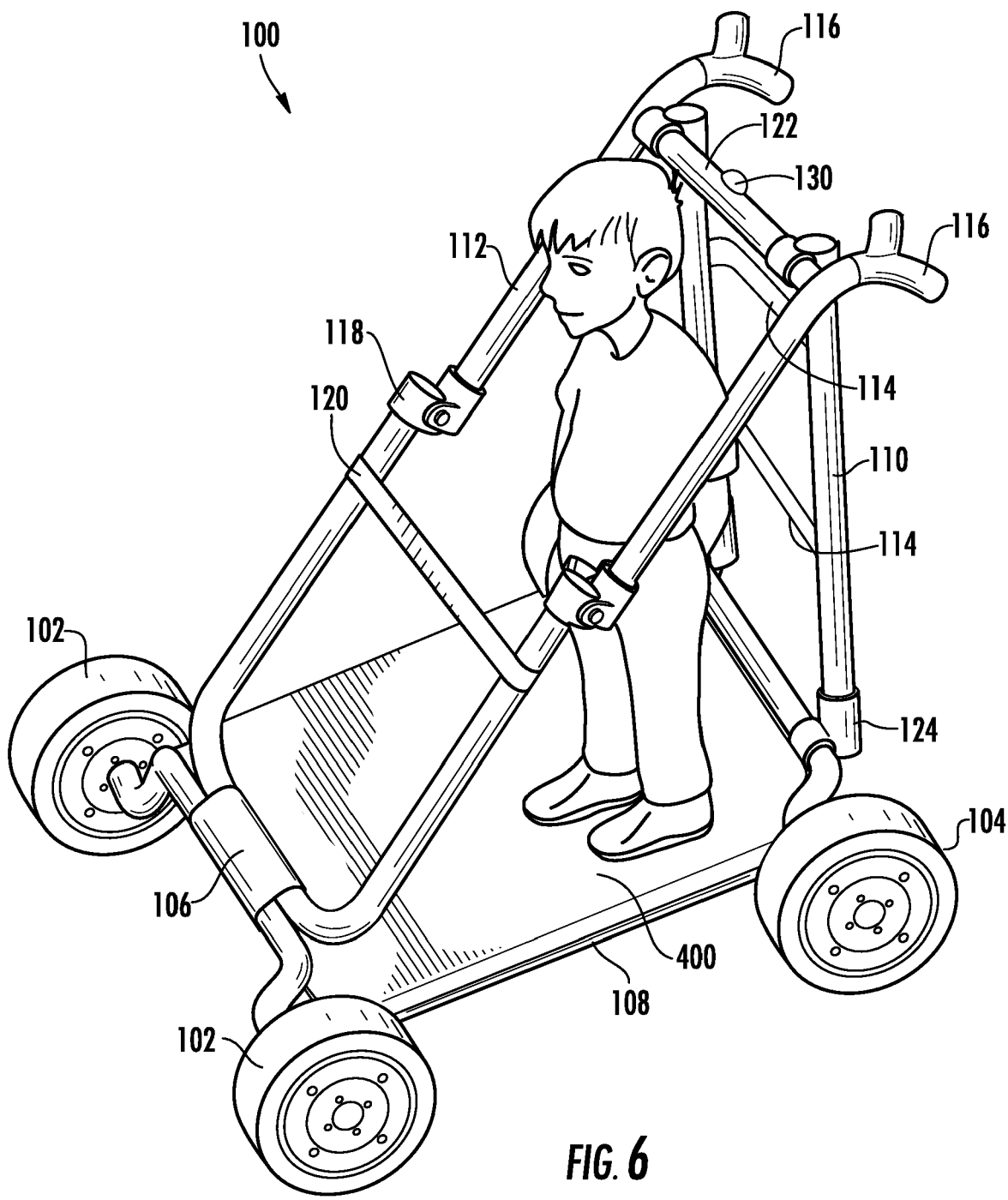
FIG. 6 is the front perspective view of a pediatric transporter as depicted in FIG. 4, illustrating, in particular, a child on the floor platform portion of the pediatric transporter.

Referring now to FIG. 6, and similar to FIG. 4, a pediatric transporter 100 is shown in a configuration suitable as a stander or ride-upon walker. The pediatric transporter 100 shown here depicts a child standing upon the removable, storable standing platform 400. The child can utilize support bar 120 for gripping, balance, and support.

Figure 7:
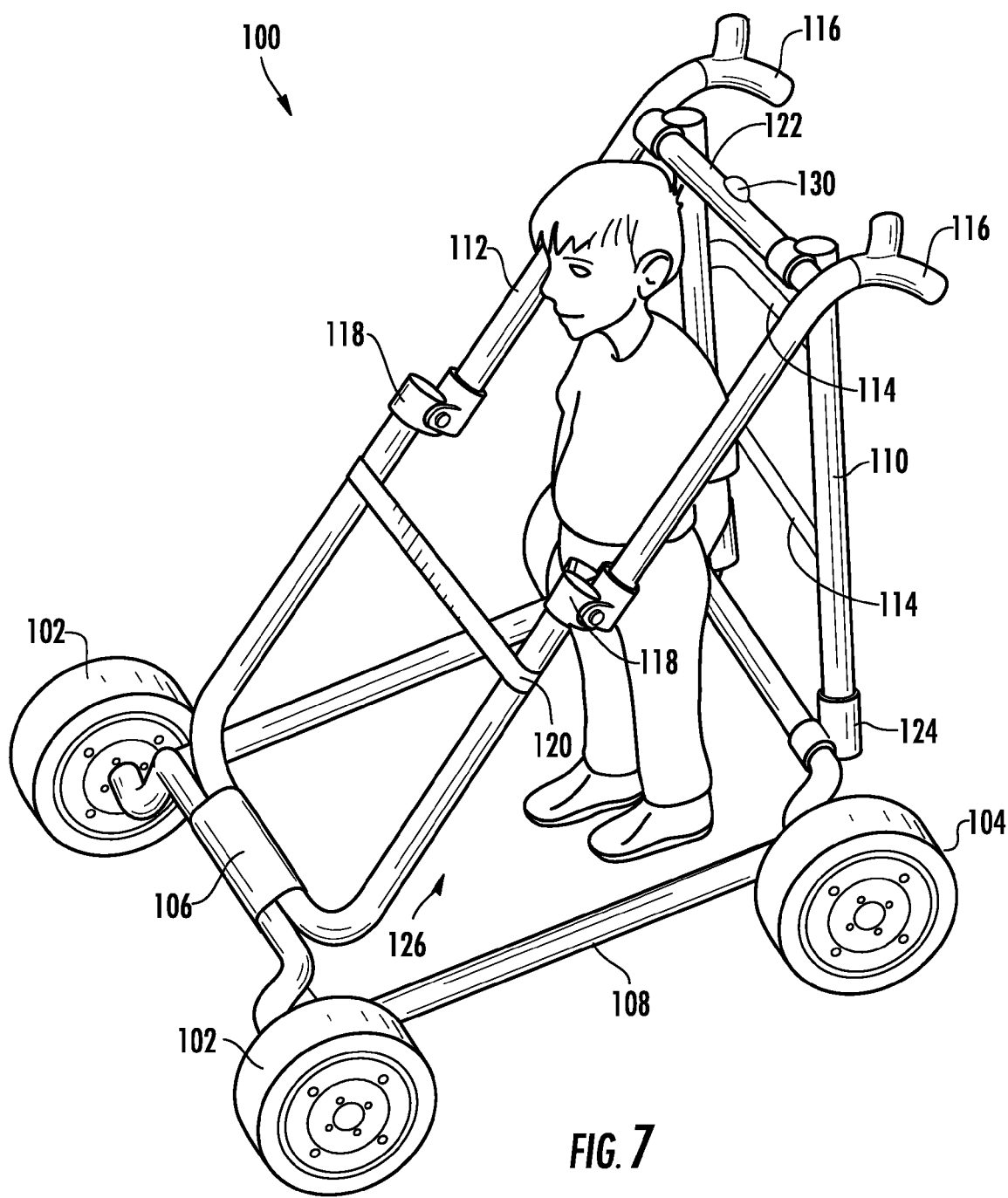
FIG. 7 is the front perspective view of a pediatric transporter as depicted in FIG. 4, illustrating, in particular, a child utilizing the pediatric transporter as a walker without the use of the standing platform and from within the pediatric transporter.

Referring now to FIG. 7, and generally similar to FIGS. 4 and 6, a pediatric transporter 100 is shown in an alternative configuration suitable for a child utilizing the pediatric transporter 100 as a walker without the use of the standing platform in area 126 and from standing within the pediatric transporter 100. In this configuration, a child is able to walk assisted by the bar 120, and other support frame members as needed. Additionally, this configuration provides the ability of a caregiver to be walking immediately behind the pediatric transporter 100 and holding handle bars 116, proximate to the child in order to assist if necessary.

In operation the pediatric transporter 100 provides walker, stander, sitting chair, stroller, wheelchair, and the like, functionality. By way of example, consider a child with special needs who can walk, but not at length, who wishes to be out and about with caregivers who do not wish to cumulatively cart around a multiplicity of support and mobility devices such as a stroller, walker, stander, etc. This child can utilize the pediatric transporter 100 as a walker (walking behind the device or walking within the device without the standing platform in place).

The pediatric transporter 100 is ideal for a small child who cannot walk independently or has hypotonia (low muscle tone) due to various medical conditions (i.e., spina bifida, cerebral palsy, Down's Syndrome, muscular dystrophy, various metabolic disorders, etc.—basically any medical condition prohibiting a child from walking or walking long distances). The child will, however, need to be stable enough to stand, which is usually the case with muscular disorders. Even limited use of the pediatric transporter 100 as a walker provides exercise to the child.

Additionally, use of the pediatric transporter 100 provides the child with joint compression. Joint compression is very important in physical therapy. By way of example, as a child walks, compression is created on the joints in the foot and ankle areas. This compression is helpful especially to special needs children. A child confined to a wheelchair will not receive such a benefit. The pediatric transporter 100 not only provides the opportunity for this compression when used as a walker, but also provides alternative arrangements, such as utilized as a stroller or seat, that enable the child to have a chance to rest.

Once the child has tired or is otherwise unable to continue with walking, a caregiver optionally, can remove the removable, storable seat 300 from the back frame member 110 and its support bars 114 and place it across on a lower back support 114 and front frame support bar 120 to form a comfortable, stable seat 300 for the child.

If the child wishes to stand within the pediatric transporter 100, utilizing it as a stander or stand-up stroller, the caregiver can stow the removable, storable seat 300 and instead insert the removable, storable standing platform 400. The child then can utilize support bar 120 for gripping, balance, and support. Utilization of the pediatric transporter in this method benefits the child by providing opportunities for balancing and some continued joint compression as the pediatric transporter 100 is moved.

Advantageously, the pediatric transporter 100 is small and compact enough to be stored in a seating area of an automobile. The pediatric transporter 100 is lightweight, yet strong enough to safely and securely transport a child. The pediatric transporter 100 is easily expanded or collapsed and folded without burdensome and time-consuming steps.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A pediatric transporter comprising:
   a plurality of frame members joined each to the other forming a frame, the frame members comprising a back frame, a base frame, and a front frame;
   the back frame comprising lateral frame members;
   the base frame comprising lateral frame members;
   a removable, rigid, storable seat, the seat configured for use interchangeably as a generally planar seat disposed upon a first support bar disposed upon the front frame member and a second support bar disposed on the back frame member of the pediatric transporter and configured for storage on the back frame member of the pediatric transporter when not in use as a seat; and
   a removable, storable standing platform comprising channels on downwardly extending portions of the lateral sides of the standing platform, the channels extending from the front of the standing platform to the back of the standing platform; the standing platform configured for use interchangeably as a standing platform disposed upon the base frame of the pediatric transporter below the first and second support bars, configured to cover entirely an area defined by a perimeter of the base frame wherein the channels of the standing platform engage the lateral members of the base frame, and configured for storage on the back frame member of the pediatric transporter when not in use as a standing platform wherein the channels of the standing platform engage the lateral members of the back frame;
   wherein the first support bar is configured to support the seat when the seat is in use and is configured as a handle bar for a standing child standing within the pediatric transporter when the seat is not in use;
   wherein the pediatric transporter is reconfigurable interchangeably as a stand-behind walker, stand-within walker, stander, sitting chair, stroller, and wheelchair.

2. The pediatric transporter of claim 1, further comprising:
   a plurality of hinges disposed upon the frame to provide foldability, collapsibility, and portability of the pediatric transporter.

3. The pediatric transporter of claim 1, further comprising:
   a lever configured to be depressed single-handedly to collapse the pediatric transporter.

4. The pediatric transporter of claim 1, further comprising:
   a plurality of wheels disposed upon the frame.

5. The pediatric transporter of claim 4, further comprising:
   a plurality of handlebars disposed upon the frame; and
   a handgrip disposed upon each of the plurality of handlebars.

6. A portable, collapsible, and multifunctional pediatric transporter for transporting a child with combined and interchangeable walker, stander, sitting chair, stroller, and wheelchair services, the pediatric transporter comprising:
   a plurality of frame members joined each to the other forming a frame, the frame members comprising a back frame, a base frame, and a front frame, wherein the back frame is perpendicular to the base frame and hingedly connected at a first back frame edge and a first base frame edge, and wherein the front frame member frame is coupled to both the back frame and the base frame at a second back frame edge and a second base frame edge, and wherein the front frame is configured to hingedly fold in half to allow the back frame to fold forward from a position perpendicular the base member to a parallel position just above the base frame;
   the back frame comprising lateral frame members;
   the base frame comprising lateral frame members;
   a plurality of wheels disposed upon the frame;
   a plurality of handlebars disposed upon the frame;
   a handgrip disposed upon each of the plurality of handlebars;
   a removable, rigid, storable seat, the seat configured for use interchangeably as a generally planar seat disposed upon a first support bar disposed upon the front frame member and a second support bar disposed on the back frame member of the pediatric transporter and configured for storage on the back frame member of the pediatric transporter when not in use as a seat;

a removable, storable standing platform comprising channels on downwardly extending portions of the lateral sides of the standing platform, the channels extending from the front of the standing platform to the back of the standing platform; the standing platform configured for use interchangeably as a standing platform disposed upon the base frame of the pediatric transporter below the first and second support bars, configured to cover entirely an area defined by a perimeter of the base frame wherein the channels of the standing platform engage the lateral members of the base frame, and configured for storage on the back frame member of the pediatric transporter when not in use as a standing platform wherein the channels of the standing platform engage the lateral members of the back frame;

wherein the first support bar is configured to support the seat when the seat is in use and is configured as a handle bar for a standing child standing within the pediatric transporter when the seat is not in use;

a plurality of hinges disposed upon the frame to provide foldability, collapsibility, and portability of the pediatric transporter; and a lever configured to be depressed single-handedly to collapse the pediatric transporter;

wherein the pediatric transporter is reconfigurable interchangeably as a stand-behind walker, stand-within walker, stander, sitting chair, stroller, and wheelchair.

7. A method for pediatric transportation with interchangeable walker, stander, sitting chair, stroller, and wheelchair services, the method comprising:

utilizing a pediatric transporter comprising:

a plurality of frame members joined each to the other forming a frame, the frame members comprising a back frame, a base frame, and a front frame;

the back frame comprising lateral frame members;

the base frame comprising lateral frame members;

a removable, rigid, storable seat, the seat configured for use interchangeably as a generally planar seat disposed upon a first support bar disposed upon the front frame member and a second support bar disposed on the back frame member of the pediatric transporter and configured for storage on the back frame member of the pediatric transporter when not in use as a seat; and a removable, storable standing platform comprising channels on downwardly extending portions of the lateral sides of the standing platform, the channels extending from the front of the standing platform to the back of the standing platform; the standing platform configured for use interchangeably as a standing platform disposed upon the base frame of the pediatric transporter below the first and second support bars; configured to cover entirely an area defined by a perimeter of the base frame wherein the channels of the standing platform engage the lateral members of the base frame, and configured for storage on the back frame member of the pediatric transporter when not in use as a standing platform wherein the channels of the standing platform engage the lateral members of the back frame;

wherein the first support bar is configured to support the seat when the seat is in use and is configured as a handle bar for a standing child standing within the pediatric transporter when the seat is not in use; and operatively configuring, and selectively reconfiguring, the pediatric transporter as one from the group consisting of: a stand-behind walker, stand-within walker, stander, sitting chair, stroller, and wheelchair.

8. The method for pediatric transportation with interchangeable walker, stander, sitting chair, stroller, and wheelchair services of claim 7, further comprising:

utilizing a pediatric transporter further comprising:

a plurality of hinges disposed upon the frame to provide foldability, collapsibility, and portability of the pediatric transporter; and folding the pediatric transporter for transportability and storage.

9. The method for pediatric transportation with interchangeable walker, stander, sitting chair, stroller, and wheelchair services of claim 7, further comprising:

utilizing a pediatric transporter further comprising:

a lever configured to be depressed single-handedly to collapse the pediatric transporter;

depressing the lever to single-handedly collapse the pediatric transporter for transportability and storage.

10. The method for pediatric transportation with interchangeable walker, stander, sitting chair, stroller, and wheelchair services of claim 7, further comprising:

utilizing a pediatric transporter further comprising:

a plurality of wheels disposed upon the frame;

a plurality of handlebars disposed upon the frame; and a handgrip disposed upon each of the plurality of handlebars.

11. The method for pediatric transportation with interchangeable walker, stander, sitting chair, stroller, and wheelchair services of claim 7, further comprising:

operatively reconfiguring the pediatric transporter as a stand-behind walker with the removable, storable standing platform stored upon a back of the frame.

12. The method for pediatric transportation with interchangeable walker, stander, sitting chair, stroller, and wheelchair services of claim 7, further comprising:

operatively reconfiguring the pediatric transporter as a ride-upon walker with the removable, storable standing platform placed within the frame.

13. The method for pediatric transportation with interchangeable walker, stander, sitting chair, stroller, and wheelchair services of claim 7, further comprising:

operatively reconfiguring the pediatric transporter as a stand-within walker.

14. The method for pediatric transportation with interchangeable walker, stander, sitting chair, stroller, and wheelchair services of claim 7, further comprising:

operatively reconfiguring the pediatric transporter as a stander with the removable, storable standing platform placed within the frame.

15. The method for pediatric transportation with interchangeable walker, stander, sitting chair, stroller, and wheelchair services of claim 7, further comprising:

operatively reconfiguring the pediatric transporter as a sitting chair with the removable, storable seat.

16. The method for pediatric transportation with interchangeable walker, stander, sitting chair, stroller, and wheelchair services of claim 7, further comprising:

operatively reconfiguring the pediatric transporter as a stroller.

17. The method for pediatric transportation with interchangeable walker, stander, sitting chair, stroller, and wheelchair services of claim 7, further comprising:

operatively reconfiguring the pediatric transporter as a wheelchair.

\* \* \* \* \*